United States Patent

[11] 3,602,244

| [72] | Inventor | Irving A. Ward<br>Hacienda Heights, Calif. |
|---|---|---|
| [21] | Appl. No. | 868,526 |
| [22] | Filed | Oct. 22, 1969 |
| [45] | Patented | Aug. 31, 1971 |
| [73] | Assignee | Modern Faucet Mfg. Co.<br>Los Angeles, Calif. |

[54] VALVE ASSEMBLY
10 Claims, 5 Drawing Figs.

[52] U.S. Cl. ................................. 137/119,
                                                 137/610
[51] Int. Cl. ................................. F03c 1/04,
                                                 F16k 31/143
[50] Field of Search ...................... 137/118,
                                          119, 608, 609, 610

[56] References Cited
UNITED STATES PATENTS
2,867,230   1/1959   Bletcher ................. 137/119

| 3,265,082 | 8/1966 | Perlman | 137/119 |
| 3,336,935 | 8/1967 | Ward | 137/119 |
| 3,376,884 | 4/1968 | Bucknell | 137/119 |
| 3,461,901 | 8/1969 | Bucknell | 137/119 |

Primary Examiner—Laverne D. Geiger
Assistant Examiner—William H. Wright
Attorney—Lyon & Lyon ABSTRACT: There is disclosed herein a valve assembly principally for use with a tub filler or spout and a spray head. The spout is connected with a fluid supply, and the valve assembly is mounted within the spout. The assembly includes an antisiphon valve. The valve assembly further includes a button member and seat arrangement for allowing fluid to pass from the inlet to the outlet of the spout or to divert the fluid to a spray head coupled with the valve assembly. Diversion of fluid to the spray head occurs upon operation of the spray head and as a result of a differential pressure operating on components of the valve assembly.

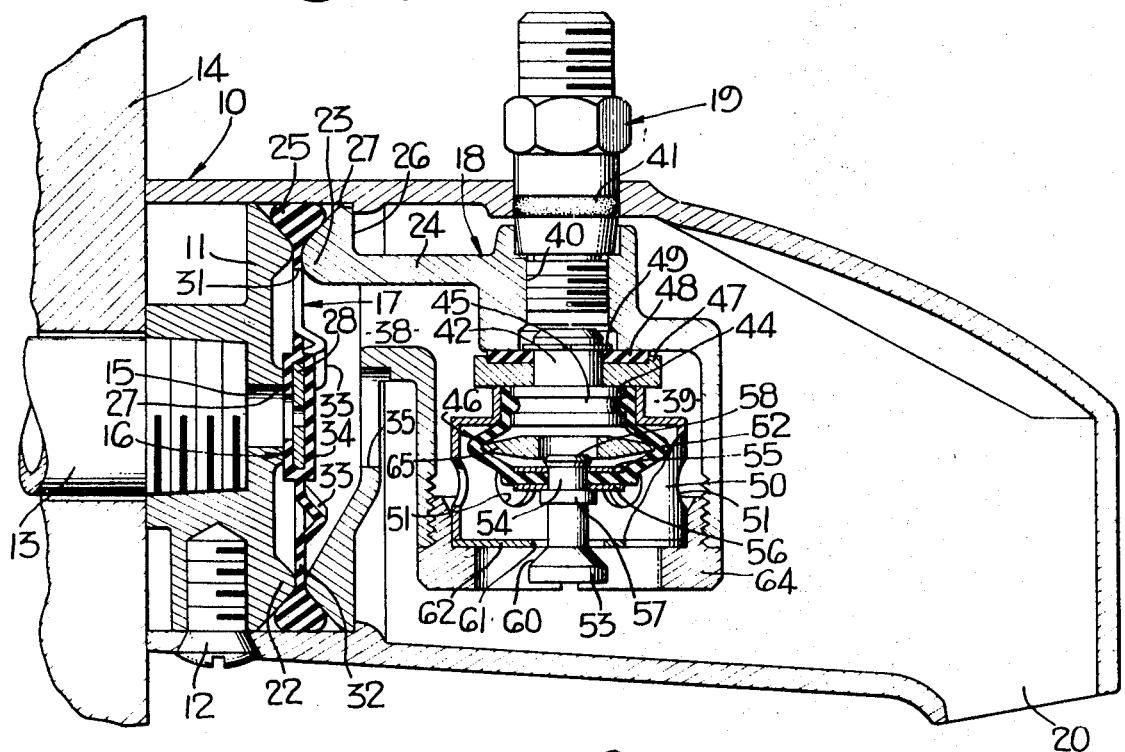
Fig.1.
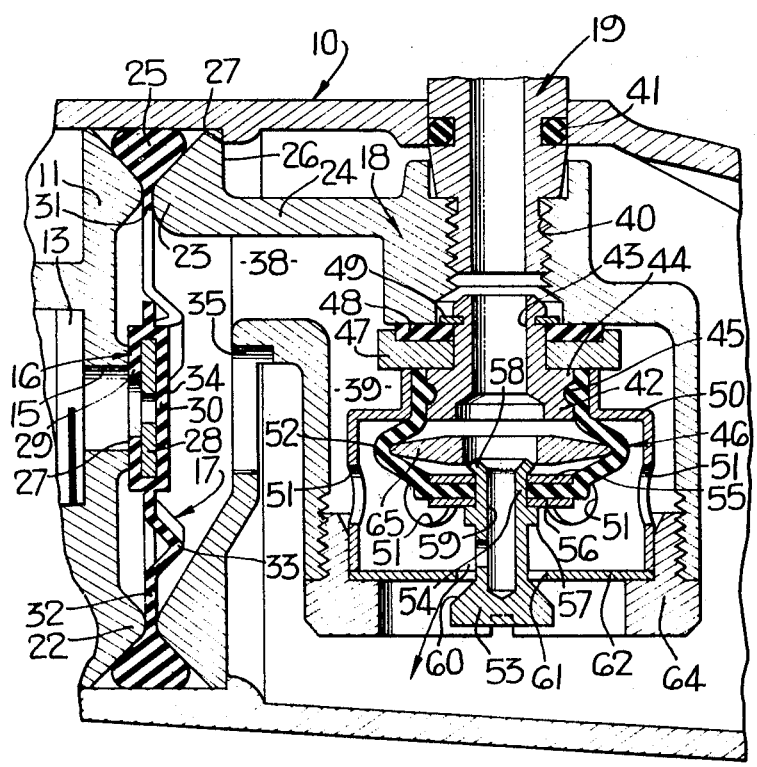
Fig.2.
Fig.3.
INVENTOR
IRVING A. WARD
BY Lyon & Lyon
ATTORNEYS

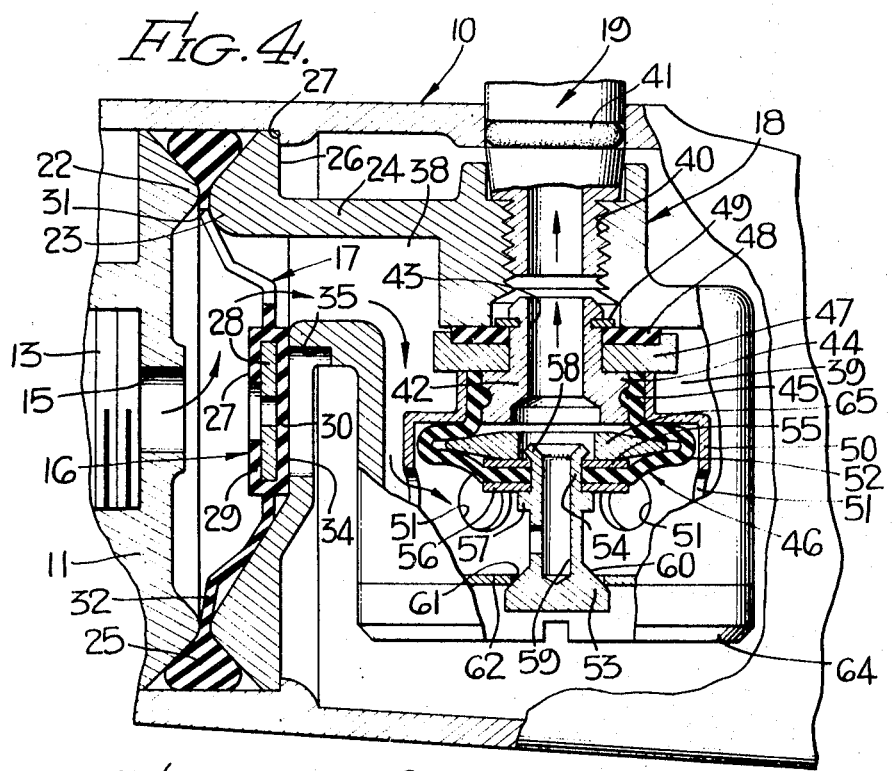
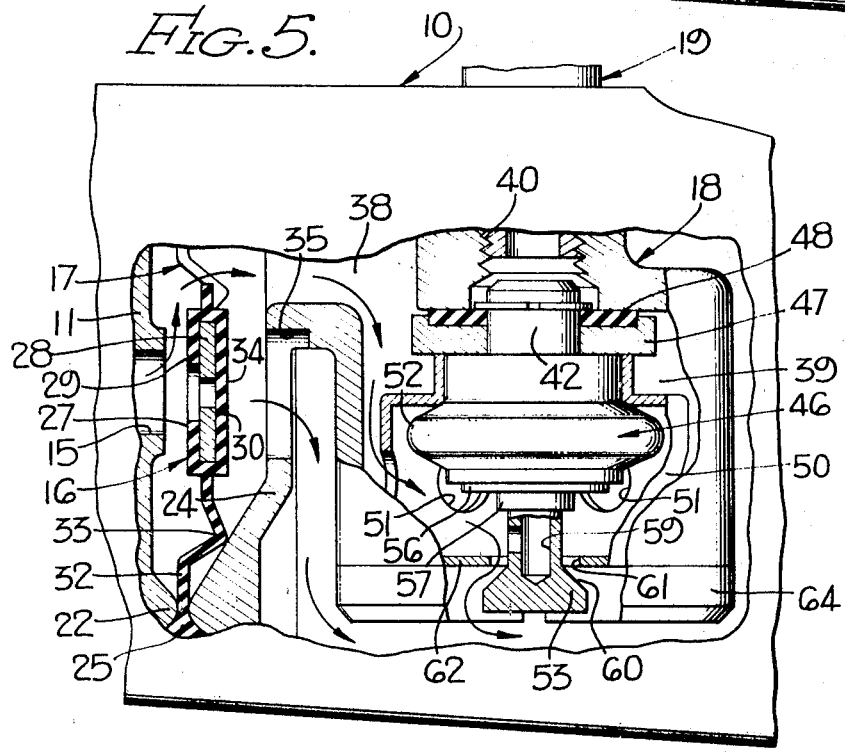

VALVE ASSEMBLY

This invention relates to valves and more particularly to a valve assembly for a tub filler or spout having a spray head coupled therewith, said valve assembly selectively enabling fluid flow through the spout or through the spray head.

Various types of valve assemblies have been devised for filler spouts and the like for enabling selective diversion of water to a spray head or the like. Typical devices of this nature are characterized by relatively complex and costly construction.

It is thus an object of the present invention to provide an improved valve assembly.

It is an additional object of this invention to provide a novel valve assembly for use with a spout for enabling selective diversion of fluid to a spray device.

Another object of this invention is to provide a tub filler apparatus including a novel diverter valve assembly and antisiphon valve arrangement.

These and other objects and features of the present invention will be better understood through a consideration of the following description taken in conjunction with the drawings in which:

FIG. 1 is a cross-sectional view of a tub filler having mounted therein an antisiphon valve and diverter valve assembly according to the concepts of the present invention;

FIG. 2 is a fragmentary cross-sectional view similar to FIG. 1;

FIG. 3 is a partial elevational view of an antisiphon valve employed in the filler of FIGS. 1 and 2;

FIG. 4 is a partial cross-sectional view of the apparatus of FIG. 1 illustrating the components of the valve assembly in a position in which fluid is diverted to an associated spray head; and FIG. 5 is a similar cross-sectional view illustrating the components of the valve assembly in a normal position for allowing fluid flow to the outlet of the tub filler.

Turning now to the drawings, a tub filler apparatus according to the present invention is illustrated and includes a spout 10 of essentially typical configuration having an internal support partition 11 secured therein by a setscrew 12. A water supply nipple 13 extends through a wall 14 and is threaded into the partition 11 for supplying water to the spout. The partition 11 has an outlet passageway 15 which is normally covered by the central diaphragm 16 of the antisiphon check valve 17. A valve assembly 18 is mounted within the spout, and a fitting 19 is coupled with the valve assembly and extends through an opening in the upper portion of the spout 10. The fitting 19 is connected to a spray device or spray head, not shown, of conventional construction having its own on-off valve. As will appear subsequently, when water is supplied through the nipple 13 it causes the diaphragm 16 to move away from the passageway 15 and water to flow to an outlet 20 of the spout 10. When the spray head is operated, that is, turned on, the valve assembly 18 operates to divert the flow of water from the supply nipple 13 to the fitting 19 and thus to the spray head.

As noted above, the support partition 11 is secured in the spout 10 by the setscrew 12. The nipple 13 then serves to hold the partition and spout on the wall 14. The partition 11 includes an outer curved flange 22. A similar curved flange 23 is provided at the upstream end of the body 24 of the valve assembly 18. The downstream edge 26 of this flange is seated against a circular protuberance 27 formed within the spout 10. The check valve 17 is made of flexible material, such as ethylene propylene rubber and includes an outer enlarged portion or rim 25. The rim 25 is firmly sandwiched between the flanges 22 and 23. The central portion of the check valve 17 includes the diaphragm 16 which presents a flat surface 27 to the outlet end of the passageway 15 in the partition 11. An internal stiffener 28 is provided and is sandwiched between the circular disk portions 29 and 30 of the diaphragm 16. The check valve 17 includes openings 31, and webs 32 having V-shaped pleats 33 coupling the diaphragm 16 with the outer rim 25. This construction allows the diaphragm 16 to close the passageway 15 when no water is flowing through the supply nipple 13. When the water is turned on, the diaphragm 16 is moved away from the passageway 15 thereby allowing water to flow through the openings 31 in the check valve. The outer face 34 of the diaphragm 16 also serves to close an opening 35 in the body 24 because of flexing of the valve as seen in FIG. 4. The opening 35 principally serves as a secondary drain for the valve assembly 18 in the event the collar button thereof, which is described subsequently, remains in a closed position upon termination of the supply of water to the spout.

The body 24 of the valve assembly 18 includes an inlet chamber 38 communicating with an outlet chamber 39 of generally cylindrical interior configuration. The body 24 has a threaded spray outlet 40 which receives the lower threaded end of the fitting 19. An O-ring 41 provides a seal between the fitting 19 and the spout 10. A neck member 42, which has a passageway 43 therethrough as seen in FIGS. 2 and 4, is positioned below the spray outlet 40 and includes a flange 44 with a groove 45 therein for receiving the upper end of a rubber boot 46. The gasket plate 47 and washer 48 are mounted on the neck member 42 above the flange 44 and are retained thereon by a retainer clip 49. A cup-shaped housing 50 has a plurality of openings 51 in the wall thereof, and the upper end fits over the upper end of the boot 46 adjacent the gasket plate 47 and around the flange 44 of the neck member 42. The outer periphery 52 of the boot 46 is in a V-shaped configuration to allow the boot to expand and compress as seen in FIGS. 1 and 4, respectively. A collar button 53 has an upper end 54 inserted into the lower end of the boot 46, a pair of washers 55 and 56 being sandwiched between a flange 57 on the button and an upper expanded end 58. Before the upper end 58 is expanded, the collar button is inserted through the washer 56, the lower end of the boot 46 and the washer 55. The collar button has a passageway 59 therethrough as best seen in FIGS. 2 and 4. The lower end of the collar button 53 has a frustoconical surface 60 which cooperates with an opening 61 in a seat washer 62 to control waterflow from the housing 50 to the outlet 20 of the spout 10. That is, with the button 53 in the lower position as seen in FIGS. 1, 2 and 5, water flows through the opening 61 in the seat washer 62 past the inclined surface 60 of the button 53 to the outlet 20 of the spout 10. When the button 53 is in the upper position as shown in FIG. 4, which occurs because of the reduced pressure provided in the passageway 59 when the spray head (not shown) is turned on and because of the greater upward force acting on the underside of the boot 46 as compared to the relatively smaller downward force acting on the bottom of the button 53, the waterflow is through the passageways 59 and 43 up through the valve assembly 18 to the fitting 19 and ultimately to the spray head.

The internal components of the valve assembly 18 are retained in position by means of a retainer bushing 64 which is threaded into the lower end of the body 24. A boot support 65 is positioned within the boot 46 and aids in maintaining the peripheral V-shaped configuration of the boot. As will be apparent from the drawings, the support 65 has an aperture therethrough for waterflow to and from the fitting 19.

With no waterflow from the supply nipple 13, the antisiphon check valve 17 and components of the valve assembly 18 are in the positions illustrated in FIGS. 1 and 2. As will be apparent to those skilled in the art, the valve 17 provides an antisiphon feature to prevent waterflow back into the supply nipple 13 upon termination of the flow of water from the supply. Additionally, the collar button 53 is in its lower position and thereby allows water to drain from the valve assembly 18 and from the fitting 19 and associated hose coupled to the spray head. In the event the movable components of the valve assembly 18 become clogged such that either water cannot pass through the openings 61 in the seat washer 62, or the inclined surface 60 of the collar button 53 is seated against the seat washer 62, water still may drain through the opening 35 in the body 24 of the valve assembly 18. As is known to those skilled in the art the retention of water within valves and the like tends to clog the same as well as give rise to possible corrosion problems.

When the water supply is turned on and water flows through the supply nipple 13, the diaphragm 16 of the antisiphon check valve 17 moves away from the support partition 11, and thus the passageway 15 therethrough, and allows water to flow into the body 24 as seen in FIG. 5. Water flows through the openings 51 in the housing 50, past the collar button 53 and to the outlet 20 of the spout 10. Water also may flow through the opening 35 in the body 24 of the valve assembly 18.

When the spray head is turned on, water can then flow into the passageway 59 in the collar button 53, up through the fitting 19, and the associated hose to the shower head. Because of the different effective areas of the lower side of the boot 46 and upper side of the bottom of the collar button 53, a differential pressure exists which compresses the boot 46 as shown in FIG. 4 thereby raising the collar button 53 and causing the inclined surface 60 to mate at the opening 61 in the seat washer 62 thereby terminating flow to the outlet 20 of the spout. At this time, the diaphragm 16 of the antisiphon valve 17 covers the opening 35 in the valve body 24 because of the reduced outlet pressure in the spout 10. The operation causes the water to flow up through passageway 59, the fitting 19, and the hose to the spray head.

When the spray head is turned off, water can no longer flow into the passageway 59 in the collar button 53 and the differential pressure within the outside of the boot 46 as well as the pressure on the inclined surface 60 of the collar button 53 cause the collar button to move to the lower position as seen in FIG. 5 essentially by gravity thereby allowing waterflow to the outlet 20 of the spout 10. When the water supply is turned off, irrespective of whether the collar button 53 is up or down, the components return to the position shown in FIG. 2 thereby allowing water to drain from the valve assembly and associated spray components through the passageway 59 past the collar button 53 as seen in FIG. 2.

It thus should be apparent that a relatively simple spout and valve assembly therefor are provided. Many of the components may be made of plastic material. For example, the neck member 42, boot support 65 and retainer bushing 64 typically may be made of a plastic material sold under the name Delrin. The antisiphon valve 17 and boot 46 may be made of rubber. The washer 48 may be made of a flexible rubber and plastic material such as that sold under the name Hycar. Generally, the body 24, gasket plate 47, housing 50 and seat washer 62 are made of brass.

The present embodiment of this invention is to be considered in all respects as illustrative and not restrictive.

What is claimed is:

1. A spout assembly for selectively providing a flow of fluid to first and second respective outlets comprising
    spout means having an inlet and first and second outlets, said inlet being adapted to be coupled to a fluid supply,
    flexible antisiphon valve means mounted within said spout means adjacent said inlet for closing said inlet when no fluid is supplied thereto, said antisiphon valve means including a diaphragm normally biased to close said inlet and having a flexible portion for allowing said diaphragm to move away from said inlet and to open the same upon the supply of fluid to said inlet,
    valve body means mounted within said spout means, said valve body means having an inlet chamber communicating with said inlet of said spout means when opened by said diaphragm, said body means having an outlet chamber communicating with the outlets of said spout means and having an outlet passageway communicating with said second outlet,
    housing means mounted within said body means in said outlet chamber thereof, said housing means having an inlet for fluid and having an outlet for fluid communicating with said first outlet of said spout means, said outlet of said housing means forming a valve seat,
    valve closure means extending into said housing means and having a seat portion for cooperating with said valve seat of said housing means for controlling the flow of fluid from said body means to said first outlet of said spout means,
    flexible boot means coupled with said valve closure means for normally allowing said valve closure means to assume an open position wherein fluid can flow to said first outlet and for moving said valve closure means to a closed position upon demand for fluid at said second outlet, said boot means having a larger effective area than the seat portion of said valve closure means such that differential fluid pressures acting thereon upon demand for fluid at said second outlet causes said valve closure means to move to said closed position, and
    retainer means for securing said housing means and boot means within said body means.

2. An assembly as in claim 1 wherein
    said valve closure means comprises a button member having said outlet passageway therethrough communicating with said second outlet.

3. An assembly as in claim 1 wherein
    said housing means includes a cup-shaped member having an upper end coupled with said boot means, and includes a seat member secured at the lower end of said cup-shaped member, said seat member having an opening therein forming said valve seat of said housing means.

4. An assembly as in claim 3 wherein
    said valve closure means comprises a button member having said outlet passageway therethrough communicating with said second outlet.

5. A valve assembly for use in a waterspout or the like for selectively allowing water to flow to the outlet of the spout or to a second outlet device such as a spray head or the like comprising
    body means having an inlet chamber for receiving fluid and an outlet chamber, said body means having an outlet passageway communicating with said outlet chamber and being adapted to be coupled to said second outlet device,
    housing means mounted within said body means in said outlet chamber thereof, said housing means having a fluid inlet and a fluid outlet, said fluid outlet forming a valve seat,
    valve closure means extending into said housing means and having a seat portion cooperating with said valve seat of said housing means for controlling the flow of fluid out of said housing means,
    flexible boot means coupled with said valve closure means for normally allowing said valve closure means to assume an open position wherein fluid can flow from the fluid outlet of said housing means, and for moving said valve closure means to a closed position upon demand for fluid by said second outlet device to cause fluid to flow to said outlet passageway, said boot means having a larger effective area than the seat portion of said valve closure means such that differential fluid pressure acting thereon upon demand for fluid at said second outlet device causes said valve closure means to move to said closed position whereby said seat portion cooperates with and engages said valve seat of said housing means, and
    retainer means for securing said housing means and boot means within said body means.

6. An assembly as in claim 5 wherein
    said valve closure means comprises a button having a passageway communicating through the fluid inlet of said housing means between the outlet chamber of said body means and the outlet passageway of said body means.

7. A valve assembly for use in a waterspout for respectively controlling waterflow from a supply to the outlet of said spout and to a spray device comprising body means having an inlet chamber for receiving water and an outlet chamber, said body means having an outlet passageway communicating with said outlet chamber, said outlet passageway being adapted to be coupled with a spray device, housing means mounted within said body means in said outlet chamber thereof, said housing means having a wall with an aperture therein providing a fluid inlet to said housing means and having a bottom with an aperture therein providing a fluid outlet from said housing means to the outlet of a spout, said aperture forming a valve seat, support means mounted in said outlet chamber of said body means at said outlet passageway, valve closure means extending into said housing means and having a seat portion cooperating with said valve seat on said housing means for controlling the flow of water through the fluid outlet of said housing means, said valve closure means having a port therein, flexible boot means having an upper end coupled with said support means and said housing means, and having a lower end coupled with said valve closure means for normally allowing said valve closure means to assume an open position wherein water can flow from the fluid outlet of said housing means, and for moving said valve closure means to a closed position upon demand for water by said spray device to cause water to flow through said port in said valve closure means to said outlet passageway of said body means, said boot means having a larger effective area than the seat portion of said valve closure means to allow water pressure to raise said boot means upon demand for water at said spray device to cause said valve closure means to move to said closed position wherein said seat portion cooperates with said valve seat of said housing means to terminate waterflow through said fluid outlet of said housing means, and retaining means for securing said housing means, support means and boot means within said body means.

8. An assembly as in claim 7 including boot support means mounted within said boot means.

9. An assembly as in claim 1 wherein said spout means has a passageway therein communicating with said inlet thereof, partition means mounted in said inlet of said spout means, said partition means being adapted to be coupled to said fluid supply and having an opening therein communicating with said passageway in said spout means, said antisiphon valve means includes a rim, with said flexible portion of said antisiphon valve means intercoupling said rim and said diaphragm, and retaining means coupled with said rim for maintaining said antisiphon valve means within said spout means.

10. An assembly as in claim 9 wherein said flexible portion of said antisiphon valve means comprises a V-shaped web interconnecting said rim and said diaphragm, said web having openings therein for allowing the passage of fluid therethrough.